(12) United States Patent
Youngbull et al.

(10) Patent No.: US 9,992,038 B2
(45) Date of Patent: Jun. 5, 2018

(54) UNDERWATER MULTI-HOP COMMUNICATIONS NETWORK

(71) Applicant: ARIZONA BOARD OF REGENTS ON BEHALF OF ARIZONA STATE UNIVERSITY, Scottsdale, AZ (US)

(72) Inventors: Cody Youngbull, Tempe, AZ (US); David Ganger, Chandler, AZ (US); Andres Mora, Tempe, AZ (US); Andrea Richa, Tempe, AZ (US); Jin Zhang, Kirkland, WA (US); Chenyang Zhou, Tempe, AZ (US); Xinhui Hu, Tempe, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 205 days.

(21) Appl. No.: 14/898,440

(22) PCT Filed: Jun. 13, 2014

(86) PCT No.: PCT/US2014/042376
§ 371 (c)(1),
(2) Date: Dec. 14, 2015

(87) PCT Pub. No.: WO2015/012970
PCT Pub. Date: Jan. 29, 2015

(65) Prior Publication Data
US 2016/0134433 A1 May 12, 2016

Related U.S. Application Data

(60) Provisional application No. 61/835,392, filed on Jun. 14, 2013.

(51) Int. Cl.
*H04B 7/212* (2006.01)
*H04L 12/403* (2006.01)
(Continued)

(52) U.S. Cl.
CPC ....... *H04L 12/4035* (2013.01); *H04B 7/2643* (2013.01); *H04B 10/11* (2013.01);
(Continued)

(58) Field of Classification Search
CPC .................................................. H04L 12/4035
(Continued)

(56) References Cited

U.S. PATENT DOCUMENTS

| 5,267,070 A | 11/1993 | Stewart et al. | 398/104 |
| 6,990,350 B2 | 1/2006 | Davis et al. | 455/452.2 |

(Continued)

FOREIGN PATENT DOCUMENTS

WO   WO 2005/096571   10/2005

OTHER PUBLICATIONS

A. Mora et al., "Ad-Hoc Multi-hop Underwater Optical Network forDeep Ocean Monitoring" In proceeding of IEEE OCEANS Conference, Sep. 23-Sep. 27, 2013, San Diego (2013).

(Continued)

*Primary Examiner* — Shripal Khajuria
(74) *Attorney, Agent, or Firm* — Norton Rose Fulbright US LLP

(57) ABSTRACT

A multi-hop ad hoc communications network may allow optical communications between underwater nodes. Each node may be fitted with environmental sensors. Each node may collect data from the sensors and transmit the data to other nodes in the network according to a time division multiple access (TDMA) scheme. The data may propagate through a series of child and parent nodes to reach a master node. The master node may have a wired connection for power and data transfer.

20 Claims, 4 Drawing Sheets

(51) Int. Cl.
| | |
|---|---|
| H04J 3/00 | (2006.01) |
| H04L 12/28 | (2006.01) |
| H04Q 9/00 | (2006.01) |
| H04Q 11/00 | (2006.01) |
| H04L 12/753 | (2013.01) |
| H04B 7/26 | (2006.01) |
| H04L 12/761 | (2013.01) |
| H04W 76/04 | (2009.01) |
| H04B 10/11 | (2013.01) |
| H04B 13/02 | (2006.01) |
| H04W 84/18 | (2009.01) |

(52) U.S. Cl.
CPC .............. *H04B 13/02* (2013.01); *H04J 3/00* (2013.01); *H04L 12/28* (2013.01); *H04L 45/16* (2013.01); *H04L 45/48* (2013.01); *H04Q 9/00* (2013.01); *H04Q 11/0062* (2013.01); *H04W 76/046* (2013.01); *H04Q 2209/30* (2013.01); *H04W 84/18* (2013.01)

(58) Field of Classification Search
USPC ........................................................ 370/347
See application file for complete search history.

(56) References Cited

U.S. PATENT DOCUMENTS

| | | | | |
|---|---|---|---|---|
| 7,953,326 | B2 | 5/2011 | Farr et al. | 398/104 |
| 2005/0232638 | A1 | 10/2005 | Fucile et al. | 398/140 |
| 2006/0245360 | A1 | 11/2006 | Ensor et al. | 370/238 |
| 2008/0159151 | A1 | 7/2008 | Datz et al. | 370/238 |
| 2010/0115130 | A1 | 5/2010 | Jun et al. | 709/242 |
| 2011/0229141 | A1 | 9/2011 | Chave et al. | 398/104 |
| 2012/0170935 | A1 | 7/2012 | Machado et al. | 398/58 |

OTHER PUBLICATIONS

International Search Report and Written Opinion for PCT/US2014/042376, dated Jan. 29, 2015.
Z. Ahmad et al., "Link Design for Multi-hop Underwater Optical Wireless Sensor Network", in 7th International Conference on Systems and Network Communications, pp. 65-70 (2012).
Z. Ahmad, "Underwater Optical Wireless Sensor Network", PhD Thesis, University of Warwick, Sep. 2013.
J. Akella et al., "Building Blocks for Mobile Free-Space-Optical Networks" Second IFIP International Conference on,Wireless and Optical Communications Networks, (WOCN 2005), pp. 164-168 (2005).
J. Akella et al., "Error Analysis of Multi-Hop Free-Space Optical Communication", 2005 IEEE International Conference on Communication (ICC 2005), vol. 3, pp. 1777-1781 (2005).
J. Akella, "Building Blocks for Multi-Hop and Mobile Ad Hoc Networks With Free Space Optics" PhD Thesis, Renssalear Polytechnic Institute, Dec. 2005.
D. Anguita et al., "Prospects and Problems of Optical Diffuse Wireless Communication for Underwater Wireless Sensor Networks (UWSNs)", Available from: http://www.intechopen.com/books/wireless-sensor-networks-application-centric-design/prospects-and- problems-of-optical-diffuse-wireless-communication-for-underwater-wireless-sensor-netw (2010).
D. Anguita et al., "VHDL Modeling of PHY and MAC Layer Modules for Underwater Optical Wireless Communication", 5th European Conference on Circuits and Systems for Communications (ECCSC'10), Nov. 23-25, pp. 185-188 (2010).
D. Anguita et al., "Optical Wireless Underwater Communication forAUV: Preliminary Simulation and Experimental Results", in IEEE OCEANS 2011 (2011).
S. Arnon, "Underwater optical wireless communication network", Optical Engineering 49(1), 015001 (2010).
S. Arnon, "An Underwater Optical Wireless Communication Network", in Proc. of SPIE vol. 7464 (2009).
G. Baiden et al., "Paving the way for a future underwater omni-directional wireless optical communication systems", Ocean Engineering 36, pp. 633-640 (2009).
A. Caiti et al., "Localization of Autonomous Underwater Vehicles by Floating Acoustic Buoys: A Set-Membership Approach", IEEE Journal of Oceanic Engineering, vol. 30, No. 1, pp. 140-152 (2005).
J.R. Cha et al "TDMA-based Multi-hop Resource Reservation Protocol for Real-time Applications in Tactical Mobile Adhoc Network", in MILCOM 2010 (2010).
T. Chich et al., "Unslotted Deflection Routing: A Practical and Efficient Protocol for Multihop Optical Networks", IEEE/ACM Transactions on Networking, vol. 9, No. 1, pp. 47-59 (2001).
N. Chirdchoo et al., "Aloha-based MAC Protocols with Collision Avoidance for Underwater Acoustic Networks", in proceedings of IEEE Infocom 2007 (2007).
B.M. Cochenour et al., "Characterization of the Beam-Spread Function for Underwater Wireless Optical Communications Links", IEEE Journal of Oceanic Engineering, vol. 33, No. 4, pp. 513-521 (2008).
P. Corke et al., "Environmental Wireless Sensor Networks", Proc. of the IEEE, vol. 98, No. 11, pp. 1903-1917 (2010).
W.C. Cox et al., "An Underwater Optical Communication System Implementing Reed-Solomon Channel Coding", in OCEANS 2008 (2008).
M. Doniec et al., "Using Optical Communication for Remote Underwater Robot Operation", In the 2010 IEEE/RSJ International Conference on Intelligent Robots and Systems, pp. 4017-4022 (2010).
M. Dunbabin et al., "Data Muling over Underwater Wireless Sensor Networks using an Autonomous Underwater Vehicle", in Proceedings of the International Conference in Robotics and Automation (2006).
N. Farr et al., "Optical Modem Technology for Seafloor Observatories", in OCEANS 2006 (2006).
N. Farr et al., "Optical communication system expands CORK seafloor observatory's bandwidth", in OCEANS 2010 (2010).
C. Gabriel et al., "Channel Modeling for Underwater Optical Communication", 2011 IEEE GLOBECOM Workshops (GC Wkshps), pp. 833-837 (2011).
J.W. Giles et al., "Underwater Optical Communications Systems Part 2: Basic Design Considerations", MILCOM 2005, vol. 3, pp. 1700-1705 (2005).
F. Hanson et al., High bandwidth underwater optical communication, Applied Optics, vol. 47, No. 2, pp. 277-283 (2008).
R. Jacob et al., "A Distributed Polylogarithmic Time Algorithm for Self-Stabilizing Skip Graphs", in PODC'09, pp. 131-140 (2009).
S. Jaruwatanadilok, "Underwater Wireless Optical Communication Channel Modeling and Performance Evaluation using Vector Radiative Transfer Theory", IEEE Journal on Selected Areas in Communications, vol. 26, No. 9 , pp. 1620-1627 (2008).
S. Kazemlou et al., "All-Optical Multihop Free-Space Optical Communication Systems", Journal of Lightwave Technology, vol. 29, No. 18, pp. 2663-2669 (2011).
L. Liu et al., "Prospects and problems of wireless communication for underwater sensor networks", Wirel. Commun. Mob. Comput. 8, pp. 977-994 (2008).
J. Li et al., "Monte Carlo study on pulse response of underwater optical channel", Optical Engineering 51(6), 066001 (2012).
A. Manigopal et al., "Underwater Wireless Sensor Networks: A Survey", International Journal of Computer Science and Information Technology & Security (IJCSITS), vol. 2, No. 6, pp. 1254-1261 (2012).
K. Martinez et al., "Environmental Sensor Networks", Computer, vol. 37, No. 8, pp. 50-56 (2004).
M. Sui et al., "The Modified PPM Modulation for Underwater Wireless Optical Communication", 2009 International Conference on Communication Software and Networks pp. 173-177 (2009).
M. Molins et al., "Slotted FAMA: a MAC protocol for underwater acoustic networks", in OCEANS 2006—Asia Pacific (2006).
A. Ogierman et al., "Competitive MAC under Adversarial SINR", in INFOCOM 2014, (2014).

(56) References Cited

OTHER PUBLICATIONS

M.K. Park et al., "UWAN-MAC: An Energy-Efficient MAC Protocol for Underwater Acoustic Wireless Sensor Networks", IEEE Journal of Oceanic Engineering, vol. 32, No. 3, pp. 710-720 (2007).
D. Pompili et al., "Overview of Networking Protocols for Underwater Wireless Communications", IEEE Communications Magazine, pp. 97-101 (2009).
C. Pontbriand et al., "Diffuse High-Bandwidth Optical Communications", in OCEANS 2008 (2008).
A.H. Quazi et al., "Underwater Acoustic Communications", IEEE Communications Magazine, vol. 20, No. 2, pp. 24-30 (1982).
A. Richa et al., "Towards Jamming-Resistant and Competitive Medium Access in the SINR Model" in Proceedings of the 3rd ACM workshop on Wireless, pp. 33-36 (2011).
A. Richa et al., "A Jamming-Resistant MAC Protocol for Multi-Hop Wireless Networks", in Proceedings of the 24th International Symposium on Distributed Computing (DISC), pp. 179-193 (2010).
A. Richa et al., "Competitive and Fair Medium Access despite Reactive Jamming", in Proceedings of the 31st International Conference on Distributed Computing Systems (ICDCS), pp. 507-516 (2011).
A. Richa et al., "Self-Stabilizing Leader Election for Single-Hop Wireless Networks despite Jamming", In proceedings of the 12th ACM International Symposium on Mobile Ad Hoc Networking and Computing (MOBIHOC) (2011).
A. Richa et al., "Competitive and Fair Throughput for Co-Existing Networks Under Adversarial Interference", in Proceedings of the 31st ACM Symposium on Principles of Distributed Computing (PODC), pp. 291-300 (2012).
C. Scheideler et al., "An O(log n) Dominating Set Protocol for Wireless Ad-Hoc Networks under the Physical Interference Model", in Proceedings of the 9th ACM Symposium on Mobile Ad Hoc Networking and Computing (MOBIHOC), pp. 91-100 (2008).
A. Sevincer et al., "Prototyping Multi-Transceiver Free-Space-Optical Communication Structures", in Proceedings of IEEE ICC 2010 (2010).
W.-T. Shaw et al., "Hybrid Architecture and Integrated Routing in a Scalable Optical-Wireless Access Network", Journal of Lightwave Technology, vol. 25, No. 11, pp. 3443-3451 (2007).
J.A. Simpson et al.. "A Spatial Diversity System to Measure Optical Fading in an Underwater Communications Channel", in OCEANS 2009 (2009).
J.H. Smart et al., "Underwater Optical Communications Systems Part1: Variability of Water Optical Parameters", MICOM 2005, vol. 2, pp. 1140-1146 (2005).
E.M. Sozer et al., "Underwater Acoustic Networks", IEEE Journal of Oceanic Engineering, vol. 25, No. 1, pp. 72-83 (2000).
B. Srinivasan et al., "Energy-Efficient Joint Source-Channel Codingf for Optical Wireless Underwater Networks", in OCEANS 2007 (2007).
A. A. Syed et al., "T-Lohi: A New Class of MAC Protocols for Underwater Acoustic Sensor Networks", in Infocom 2008, the IEEE 27th Conference on Computer Communications (2008).
I. Vasilescu et al., "Autonomous Modular Optical Underwater Robot (AMOUR) Design, Prototype and Feasibility Study", in International Conference on Robotics and Automation, pp. 1603-1609 (2005).
I. Vasilescu et al., "Data Collection, Storage, and Retrieval with an Underwater Sensor Network", in Proceedings of the 3rd International Conference on Embedded Networked Sensor Systems, pp. 154-165 (2005).
D.J. Vergados et al., "Enhanced End-to-End TDMA for Wireless Ad-Hoc Networks" in 12th IEEE symposium on Computers and Communications 2007 (ISCC 2007) (2007).
J. Wills et al., "Low-Power Acoustic Modem for Dense Underwater Sensor Networks", in Proceedings of the First ACM International Workshop on Under Water Networks (WUWNet), pp. 79-85 (2006).
Y.F. Wong et al., "Intelligent Sensor Monitoring for Industrial Underwater Applications", IEEE Int. Conf. Industrial Informatics, pp. 140-152 (2006).

UNDERWATER MULTI-HOP COMMUNICATIONS NETWORK

CROSS-REFERENCE TO RELATED APPLICATIONS

This application is a national phase application under 35 U.S.C. § 371 of International Application No. PCT/US2014/042376 filed Jun. 13, 2014, which claims the benefit of priority of U.S. Provisional Patent Application No. 61/835,392 to Youngbull et al. entitled "Underwater Multi-Hop Communications Network" filed on Jun. 14, 2013, which are hereby incorporated by reference.

GOVERNMENT LICENSE RIGHTS

This invention was made with government support under contract 1213070 awarded by the National Science Foundation and under contract number 1116368 awarded by the National Science Foundation. The government has certain rights in the invention.

FIELD OF THE DISCLOSURE

This disclosure relates to methods and apparatuses for communicating information, and more particularly relates to communicating information underwater.

BACKGROUND

Acoustic transmission is one method of underwater communications. Commercial off-the-shelf acoustic modems are available. However, many underwater communications applications require non-acoustic transmission, such as applications with operational constraints on sonar interference, security constraints of being overheard, and technical interests in signal speed, bandwidth, device scale and power. Even as acoustic technologies mature, the physical principles of optical signal propagation and scattering in water are fundamentally faster (1500 meters per second for acoustic signal propagation underwater compared to $10^8$ meters per second for electromagnetics) and more rapidly modulated (up to of 100 kilobaud for acoustics compared to many Gigabaud for electromagnetics).

BRIEF SUMMARY

Optical communications may be implemented for an underwater network. Optical communications provide higher bandwidths and lower energy cost per transferred bit. In certain embodiments, optical transmission may be carried out with smaller transducers than acoustic communications systems. For example, a light emitting diode may be used as the optical transducer, which measures less than a few cubic millimeters.

A TDMA-based MAC protocol, called OPT-ADHOC, may be implemented in nodes of an optical communication underwater network. The protocol may be applied in one embodiment to an ad-hoc multi-hop underwater optical sensor network. The network may include optical sensor nodes. The network may be configured such that one node acts as a master node and is directly wired to a cable with power and/or network access. Other nodes may communicate with each other through wireless optical waves.

The OPT-ADHOC algorithm is an ad-hoc multi-hop wireless sensor network protocol, which may be used in underwater networks. A cross-layer local protocol design of the algorithm combines a TDMA (Time Division Multiple Access) approach for lightwave contention resolution (MAC layer) integrated with an ad-hoc spanning tree building mechanism on a set of n nodes.

In one embodiment, nodes of the network may have sensors for collecting environmental data. The spanning tree may be used for coordinating the flow of environmental data collected by the nodes to the master node, which may then transmit this information to a computer on the surface via the wired cable. The spanning tree algorithm may also wake up certain nodes at the start of each data collection cycle. In one embodiment, each collection cycle of data is 12 minutes. Each node may go to sleep after transmitting data to a parent node on the spanning tree.

The spanning tree construction and data collection procedure may be completed without global clock synchronization. As each node wakes up at the start of each data collection cycle and establishes a link to a parent node, the node may receive the current time according to the parent node. Drifts introduced by the link traversal times may be compensated for by setting the TDMA slot to be long enough to ensure that, even if the receiver and transmitter clocks differ slightly, they will both have a long enough overlap of their respective TDMA slots to allow communication.

In one embodiment, the protocol may implement a spanning tree backbone construction for the data aggregation phase. For example, a node may wait until information from all of its children in the tree has arrived before forwarding the collected data to a parent node on the tree. Redundancy in the network may be configured such that, if a node v overhears a data transmission destined to some other parent node in the tree (given the TDMA schedule, all transmissions are collision-free), it stores that data and sends it to its parent node together with the data collected from its children nodes in the tree, provided the data arrives at v before the data v is waiting for from its children nodes. In certain embodiments, timing of the TDMA network may be configured such that v waits long enough to receive data from all the nodes within its reception range.

In one embodiment, the spanning tree may be built from scratch at the start of each data collection phase allowing the protocol to adapt to any changes, such as node/link failures and/or changes in communication ranges due to environment, in the network topology.

In one embodiment, nodes may enter into a sleep mode between data collection cycles, except when a node is sensing the environment, and may be awake only during the time when data is being transmitted to another node. The sleep mode allows long-term operation of underwater nodes without changing power sources. For example, the nodes may monitor environment conditions with a lifetime of months to years, depending on the data collection schedule, without the need of human intervention for battery recharges or replacements.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The following drawings form part of the present specification and are included to further demonstrate certain aspects of the present disclosure. The disclosure may be better understood by reference to one or more of these drawings in combination with the detailed description of specific embodiments.

DETAILED DESCRIPTION

Figure 1:
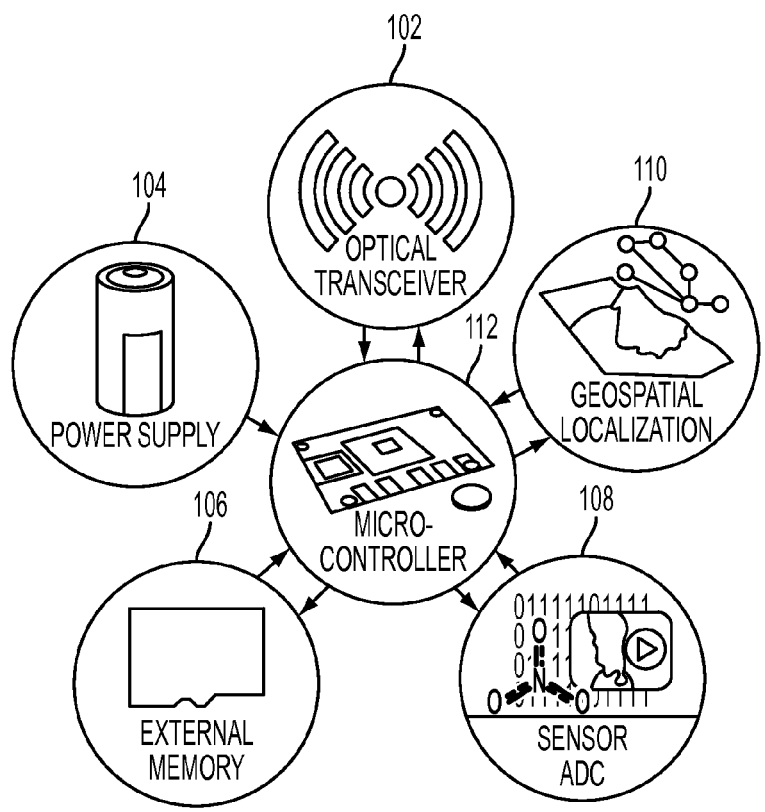
FIG. 1 is a block diagram illustrating a remote node according to one embodiment of the disclosure.

FIG. 1 is a block diagram illustrating a remote node according to one embodiment of the disclosure. A remote node may include an optical transceiver 102, a power supply 104, a memory 106, a sensor 108, a localization system 110, and/or a micro-controller 112. The optical transceiver 102 may be, for example, a light-emitting diode (LED), one or more 473 nm blue LED, Silicon photodiodes, incandescent bulbs, or the like. The optical transceiver 102 may include both an optical transmitter and an optical receiver. The optical receiver may include a photodiode, phototransistor, photomultiplier, charge-coupled device (CCD), complimentary metal-oxide-semiconductor (CMOS) circuits, or the like. The wavelength of the optical transceiver 102 may be configured corresponding to the characteristics of the water in which the node is placed. In one embodiment, multiple, wide-emission LEDs may be used to diffuse radiation patterns for a nearly uniform radiation pattern over 4π solid-angle allowing the node to have uniform transmission over a large range of angles.

According to one embodiment, the optical transceiver 102 may be the surface of the node configured to modulate its reflectance using lower power modulation of an absorption filter. By placing these modulated absorbance filters in-line with an onboard retroreflector, an optical signal originating from a distant location may be returned to that location with encoded data. The originating light source may be a laser with minimal dispersion and maximum penetration in the underwater environment.

The power supply 104 may be, for example, a battery, such as a Lithium Ion (Li-Ion) battery, a Nickel Cadmium (NiCd) battery, and/or a fuel cell. The memory 106 may be, for example, a secure digital (SD) memory card, a NAND flash memory device, eMMC memory, a hard drive, magnetic random access memory (MRAM), and the like.

The sensor 106 may be, for example, Oxygen, conductivity, temperature, depth, optical backscatter sensors, autofluorescence sensors, accelerometers, conductivity sensors, and/or pressure sensors. The sensor 106 may include other sensors that transduce a measurement into an electrical signal for processing by circuitry on the node. In one embodiment, two types of each sensor may be included in the node to provide redundancy against faults. Furthermore, when the nodes are positively buoyant and tethered by a short (e.g., approximately 1 meter) line to the seafloor, knowing the node's angle of orientation may allow calculation of the direction and strength of the local ocean current. Additionally, nodes may carry microphones, cameras, and/or video cameras.

Figure 3:
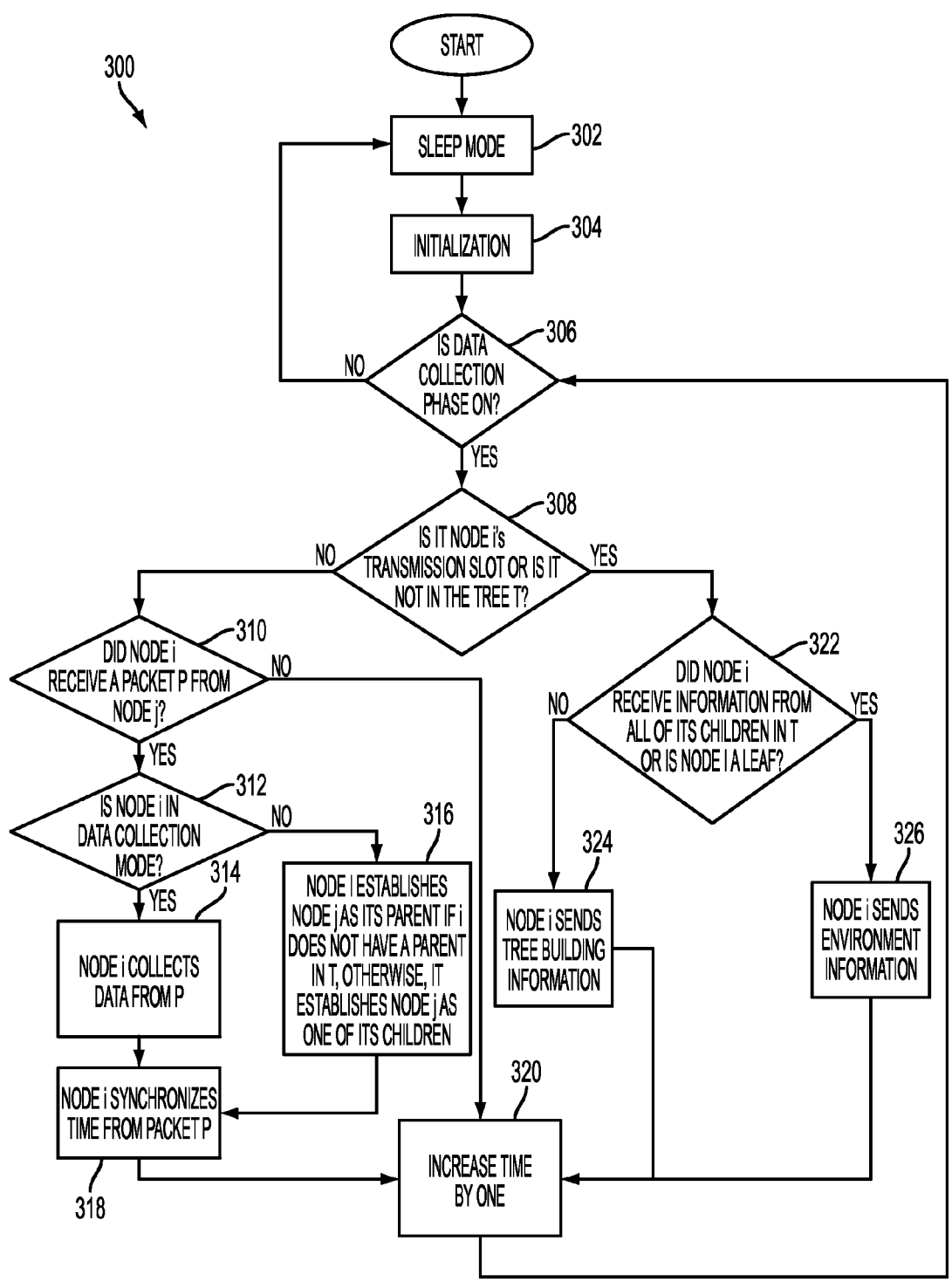
FIG. 3 is a flow chart for a communications algorithm according to one embodiment of the disclosure.

According to one embodiment, the sensor 106 may be a transbulkhead absorber. Transbulkhead absorption spectrometry may allow analyte detection through absorption in the water column. Light may be allowed to pass through the exterior water by means of a mirrored surface on a far side of a water channel as shown in FIG. 3. The reflected LED light may then be collected inside the node by, for example, a spectrometer or a translated variable-notch filter fixed onto a single-point detector.

According to another embodiment, sensors on the outside of the node may operate by measuring changes in the response to optical excitation of fluorescent/phosphorescent thin films in the presence of target analytes. The thin film sensors may be fixed to the outside of the node and may be optically excited and detected through the bulkhead of the node, such as a transparent housing or window in the node hull. On the interior of the housing may be an excitation light source, a sensor response detector, and/or a receiver. The excitation source may include a low-power ultraviolet LED, and the receiver may be a reverse-biased photodiode. The transbulkhead emission spectrometer may measure an analog intensity change detected in the sensor thin film. The analog sensor response may calibrated in the laboratory with known controls.

One or more sensors 106 may be integrated into the node or placed on an exterior of the hull of the node. In one embodiment, a thin-film sensor may be molecularly bound to a transparent sheet, from which sensor "buttons" may be stamped out and then chemically welded to flat locations on the node bulkhead.

The localization system 110 may include internal rotational sensors used to identify mote orientation. The neighborhood of network nodes near a node may be determined from packet exchange and neighbor position may be determined by relative intensity measurements of adjacent photodiodes. The combined knowledge of network neighborhood and angular position may achieve partial or complete network localization.

The micro-controller 112 may couple to each of the optical transceiver 102, the power supply 104, the memory 106, the sensor 106, and/or the localization system 110. In certain embodiments, some components may be integrated with the micro-controller 112 in a single package, such as when the memory 106 is integrated with a micro-controller in a package-on-package (PoP) configuration.

Networks of nodes illustrated in FIG. 1 may be placed in static positions using a Remotely Operated Vehicle (ROV) or deployed as an array on a frame. The nodes may then be observed from a single remote location using an imaging detector. The spatial separation of the nodes may reduce overlap of signals so their signals may be transmitted asynchronously.

A node may be configured to operate in several modes. In standby mode, a node may hibernate and conserve power. In this mode, the node may operate at minimum power levels, such as by not transmit or gathering data. The frequency at which each node enters this mode may be controlled by parameters, such as a period between maintenance or intervention, the duration of data acquisition, and/or how often data will be transmitted. In a sensing mode, each node may gather data from the environment. To save power, this mode may be entered at a predetermined frequency determined, for example, by expected environmental conditions such as tides, cyclic biological blooms, or regular chemical efflux. A higher-data acquisition frequency may be triggered if an interesting pattern is observed in the data profile. In a communication mode, a node may transmit acquired environmental and proprioceptive data. During this mode, the node power consumption may reach a maximum level. Thus, this mode may be the shortest of the three operation modes and may require a highly efficient communication scheme.

Nodes, such as those described with reference to FIG. 1, may be configured for short-range communications, such as by creating an intelligent link between nodes, to extend the coverage of the node network over long distances, such as through multi-hop networking. With multi-hop capability, a network of nodes may be distributed with sufficient spatial density (with up to 50 meters separation) to carry sensor data over large areas (up to and exceeding several square kilometers). The sensor data may be carried back to a central observation point that is either periodically recovered or continuously monitored through a cabled connection to land. In one embodiment, multi-hop nodes communicate data redundantly to every node in the underwater network.

Figure 2:
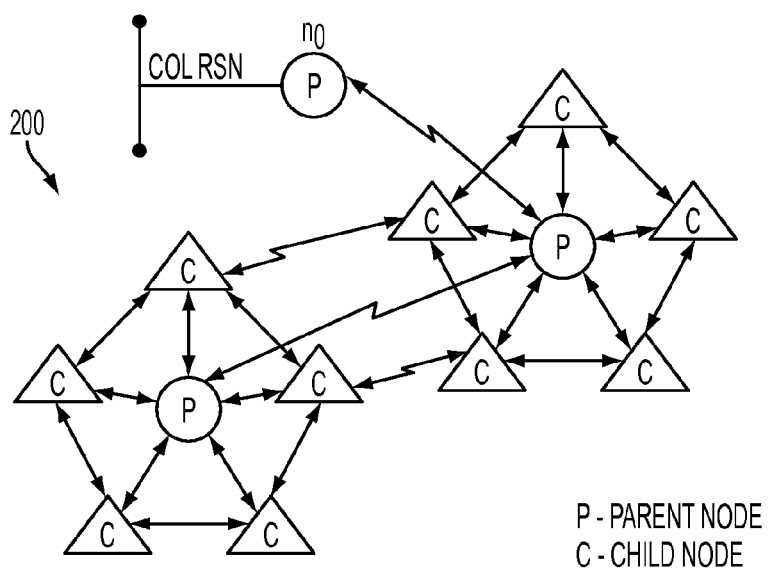
FIG. 2 is a block diagram illustrating a network of remote nodes communicating with a master node according to one embodiment of the disclosure.

FIG. 2 is a block diagram illustrating a network of remote nodes communicating with a master node according to one embodiment of the disclosure. A network 200 may include n nodes, denoted as N={$n_i$|i=0 ... n−1}. A master node may be the $n_0$ node. The master node may be wired to the cable. Other nodes may be wireless nodes, communicating through optical transceivers. The other nodes may be organized into parent nodes, P, and child nodes C. Communications may occur from child node to parent node, child node to another child node, and/or parent node to another parent node. The communications path allows multi-hop transmission between nodes to reach the master node, $n_0$. In one embodiment, a node may transmit to all nodes within range, and each other node may relay data to the master node.

A method for communicating within the network 200 may include constructing a tree T with $n_0$ as the root node. Each node, $n_i$, may acquire information regarding parent and children nodes in the network 200. Then, starting from leaf nodes, data, including sensor data, may be propagated back up to the root node, such that the master node has the entire information about the network. Then, another pass of data may propagate information in a top-down fashion from the root node to other nodes.

Nodes may maintain level information ($n_{i,level}$), which is defined with respect to its distance from the master node, calculated as the number of communication hops from $n_0$ to the node. Additionally, each node may track assigned parent and children nodes, such as $n_{i,parent}$ and $n_{i,child}$, where $n_{i,child}$ is a linked list of $n_i$'s children.

According to one embodiment, the protocol may be TDMA-based, such that each time frame is divided into n time slots, and in each time slot i, only $n_i$ may transmit. Risk of a collision between nodes is reduced or eliminated through this transmission scheme. In one embodiment, a size of a packet for transmission may be 256 bits, the transmission range of the sensors may be up to 50 m, the speed of transmission may be between 5 kHz and 300 kHz, and the data collection cycle may be 12 minutes. Sensors of the nodes may take measurements at any time, regardless of the data collection cycle period. In certain embodiments, nodes may broadcast clock time, starting from the master node, and/or an error correction code, such as a cyclic redundancy code (CRC) may be applied to transmissions. The network 200 may support a contention resolution optical wireless protocol as described herein.

The network 200 may integrate a Time Division Multiple Access (TDMA) approach for lightwave contention resolution (at the media access control (MAC) layer) with an ad-hoc spanning tree building mechanism on a set of n nodes. A spanning tree may be used for coordinating the flow of environmental data collected by the nodes to the master node, which may then transmit this information to a computer on the surface via the wired cable. The spanning tree may also wake up nodes at the start of each data collection cycle. Each node may go to sleep after it has transmitted its data to its parent node on the tree. This network provides both robustness and energy efficiency.

FIG. 3 is a flow chart for a communications algorithm according to one embodiment of the disclosure. A method 300 begins at block 302 with entering a sleep mode. At block 304, the node initializes and determines, at node 306, whether the data collection phase is on. If not, the node returns to sleep mode ad block 302. If data collection is enabled, then the method 300 continues to block 308 with determining if it is node i's transmission slot or if it is not in the tree T. If the determination at block 308 is yes then the method 300 proceeds to block 322. If the determination at block 308 is no then the method 300 proceeds to block 310.

At block 310, it is determined whether node i received a packet P from node j. If not, then the method 300 proceeds to block 320 to increase a time counter by one and then return to block 306. If the determination at block 310 is yes, then the method 300 determines at block 312 if node i is in data collection mode. If yes, then node i collects data from packet P at block 314. If no, then, at block 316, node i establishes node j as its parent if node i does not have a parent in tree T, and otherwise establishes node j as one of its children. After either of block 314 or 316 is performed, the method 300 proceeds to block 318 for node i to synchronize time from packet P and to block 320 to increase a time counter by one. After block 320, the method 300 returns to block 306.

If the determination at block 308 is yes, then the method 300 proceeds to block 322. At block 322 it is determined whether node i received information from all of its children in tree T or if node i is a leaf. If no, then, at block 324, node i sends tree building information. If yes, then, at block 326 node i sends environment information. After either of block 324 or block 326, the method 300 continues to block 320 to increase a time counter by one and return to block 306.

Figure 4:
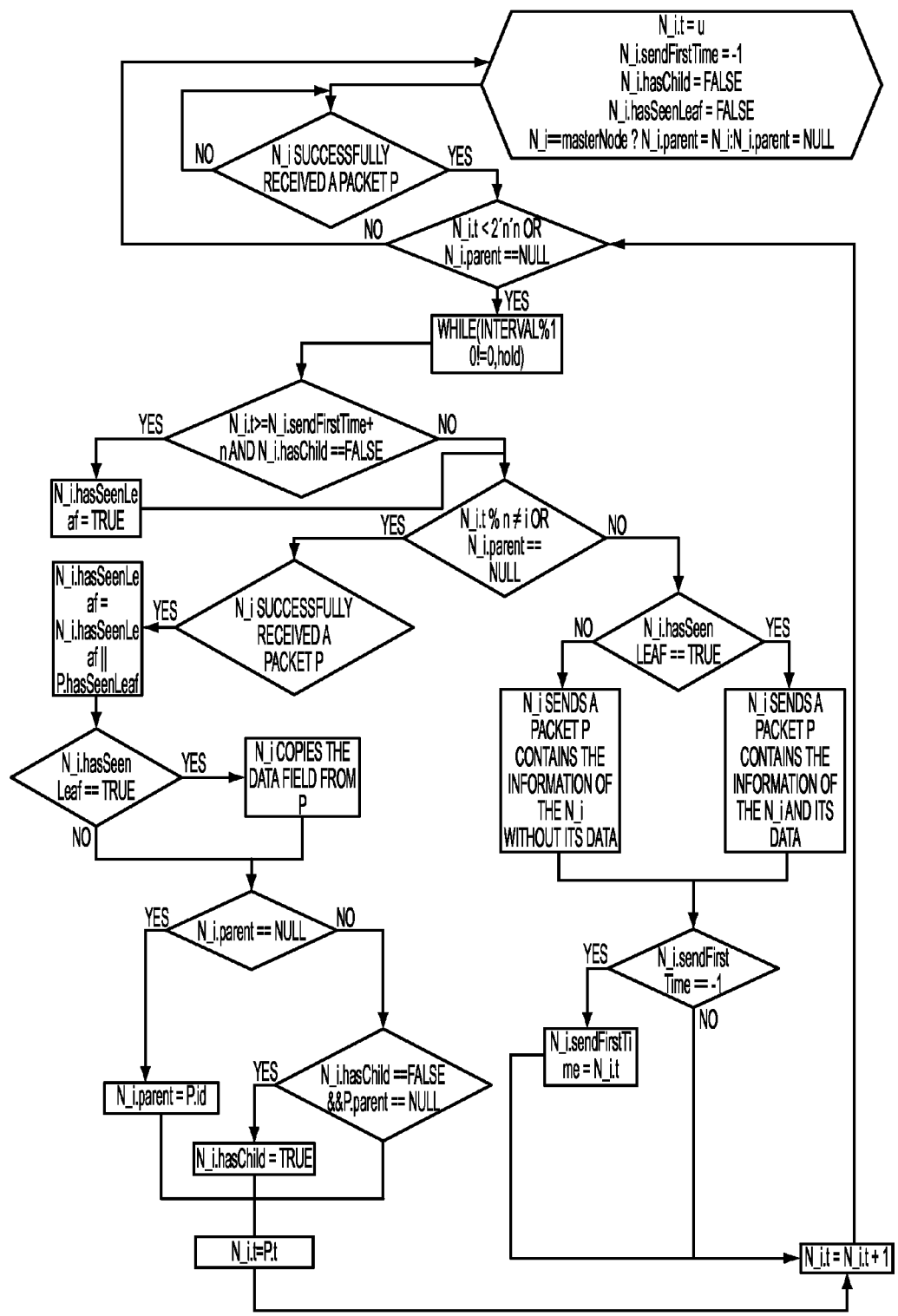
FIG. 4 is a flow chart illustrating a communications algorithm according to one embodiment of the disclosure.

FIG. 4 is a flow chart illustrating a communications algorithm according to one embodiment of the disclosure. One embodiment of the method shown in FIG. 4 is implemented in the following pseudo-code for an underwater communication protocol:

```
n_i.t <- 0
n_i.sendFirstTime <- -1
if (n_i == masterNode or successfully received a packet P then)
    while n_i.t < 2n^2 or n_i.parent == null do
        while interval % 10 != 0 do
            hold
        end while
        if (n_i.t % n != i or n_i.parent == null) then
            if n_i successfully received a packet P then
                if n_i.parent == null then
                    n_i.parent <- P.src
                    n_i.t <- P.t
                else if P.src == n_i.botId then
                    n_i.child <- P.botId
                end if
                n_i.t = P.t
            end if
        else
            if n_i.parent != null then
                n_i sends a packet P (= P.n_i, P.src, n_i.t,
                    timestamp(hh,mm,ss),"I'm alive") containing the
                    information of the n_i.{ID, timestamp, level, "I'm
                    alive"}
                if n_i.sendFirstTime == -1 then
                    n_i.sendFirstTime <- n_i.t
                end if
            end if
        end if
        if (n_i.t == n_i.sendFirstTime + n and n_i.child == 0) then
            n_i.isLeaf <- true
        end if
        // Entering data transmission phase.
        if ( (n_i.isLeaf == true or n_i.hasReceivedFromAllChildren == true) and
            n_i.t % n == i) then
            n_i sends a data packet P containing all the data gathered by n_i
and
            its children, i.e., n_i.DATA[j] for all n_i' child n_j
        else
            if n_i successfully received a packet P then
                n_i.DATA[P.src] <- P.DATA
                if n_i has successfully received all packets from
                    all children then
                    n_i.hasReceivedFromAllChildren <- true
                end if
            end if
        end if
        n_i.t <- n_i.t + 1
    end while
end if
```

Generically, an algorithm for operating the nodes, such as the specific embodiments described above and in FIG. 4, includes constructing a tree with $n_0$ as a root in a level-by-level, as well as TDMA fashion. Each of the nodes may acquire its parent and children information. Then, starting from the leaf nodes, the data may be propagated back up to the root node, such that the master node has all information about the network. Optionally, to improve the robustness of the network, each node may be provided with a copy of the entire network data, through a top-down pass of information from the root node to propagate information to each of the nodes in the tree.

In some embodiments, in addition to an identifier (ID), the nodes may also maintain level information (as $n_i$.level), which is defined with respect to the node's distance from the master node as, for example, how many communications hops are between the root node $n_0$ to the node itself. Further, each node may track its parent and children nodes (as $n_i$.parent and $n_i$.child, where $n_i$.child is a linked list of $n_i$'s children). For these communications, each time frame may be divided into n time slots, and, in each time slot i, $n_i$ may be assigned to transmit data.

Data transmission through the nodes may be in, for example, 256 bit packets through distances between approximately less than 2 meters to up to and beyond 50 meters, at transmission rates of approximately 1 kHz up to and exceeding 300 kHz (where 10 Hz means 10 bits/second). Data collection by the nodes may be set, for example, to occur at periodic intervals of approximately five to sixty minutes. When transmitted by the nodes, the data may be transmitted along with error correction codes, such as a cyclic redundancy check (CRC) codes, to improve robustness of the network.

Figure 5A:
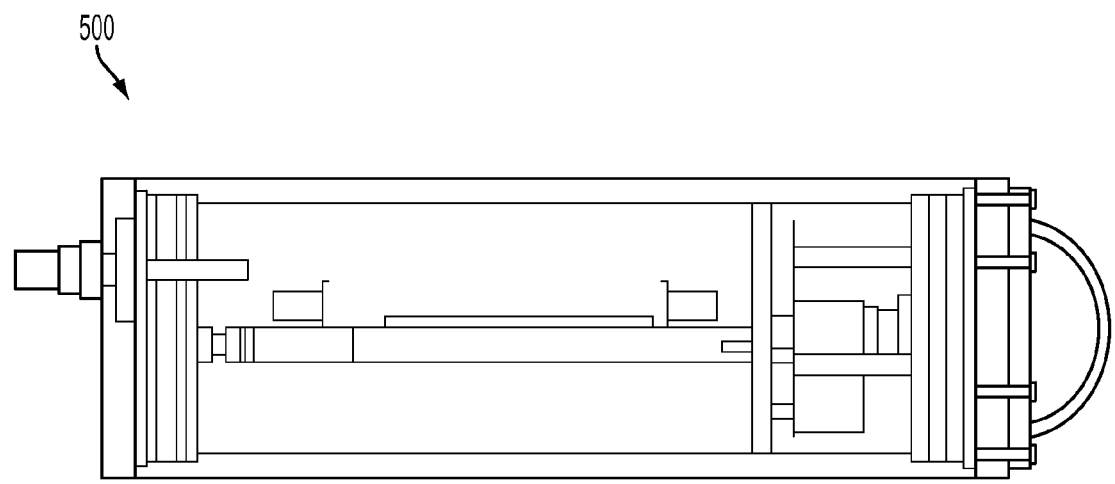
FIG. 5A is an illustration showing a master node according to one embodiment of the disclosure.

FIG. 5A is an illustration showing a master node according to one embodiment of the disclosure. A node 500 may include a cabled underwater housing to contain a principle photomultiplier (PMT). The cabled PMT may be a terminal receiver link connecting the most proximal parent node(s), and through the proximal parent node(s) of other child nodes, to the network. This PMT housing may allow submerging of the node in water. The high sensitivity photomultiplier system of the PMT may allow to monitoring of communications from the multi-hop network.

Figure 5B:
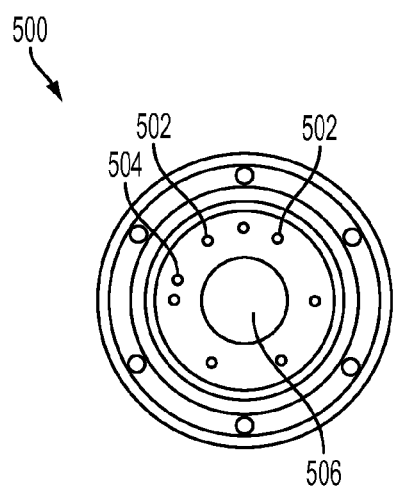
FIG. 5B is an illustration showing a master node from another viewpoint according to one embodiment of the disclosure.

FIG. 5B is an illustration showing a master node from another viewpoint according to one embodiment of the disclosure. The node 500 may include light emitting diodes (LEDs) 502, photo integrated circuit (IC) sensors 504, and photocell 506.

The nodes, which may be light and small, may move unintentionally, such as in dynamic underwater currents. Communication between these devices can be disrupted for several reasons, including: (a) obstacles (e.g., fish, descending flocculant, or algal blooms) that block communication between lightwave underwater sensor nodes for long and unpredictable periods of time, (b) mobility or orientation changes, (c) different forms of background noise in the environment (such as turbidity, day versus night ambient light, or visiting ROVs), and (d) interference problems due to "stray" transmissions from wireless network nodes (including due to back scattering from the node itself).

Once the node network is deployed, human intervention to deployed nodes may not be available until the end of the deployment, when the sensor nodes are retrieved. The protocols described here are robust against changes in the network topology (such as node and link failures and node joins/leaves) or changes in the data traffic demand (the data flow from the nodes may not be uniform at all times). They nodes are also self-stabilizing, by converging back to a valid state, in a localized fashion, with minimal or no human intervention.

According to one embodiment, the nodes may operate in MIMO (Multiple-Input-Multiple-Output) mode. That is, if a node is simultaneously transmitting through two optical transceivers, the node may compensate for the interference generated between its two simultaneous transmissions in advance at the physical (PHY) layer, which will in turn have an impact on how the media access control (MAC) layer protocols operate.

If implemented in firmware and/or software, the functions described above, such as with reference to FIG. 3 and FIG. 4, may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus, comprising: a master node; and an ad hoc network comprising at least one remote node, each remote node comprising: a power source; a transmitter comprising a light source; a receiver; a sensor; and a processor, wherein the processor is configured to: identify a communications path to the master node through at least one other remote node of the ad hoc network; obtain data from the sensor; transmit, through the transmitter, an indication of a clock value to at least one child node of the at least one remote node; receive, through the receiver, other sensor data from the at least one child node of the ad hoc network based on the transmitted clock value; relay, through the transmitter, the sensor data and the other sensor data to the master node according to a time division multiple access (TDMA) scheme along the communications path without global clock synchronization and only after receiving other sensor data from each of the at least one child node assigned to the at least one remote node; and dynamically reconfigure the communications path when the ad hoc network changes by rebuilding a spanning tree of the ad hoc network after each relay of the sensor data and the other sensor data.

2. The apparatus of claim 1, in which the transmitter is a wireless transmitter.

3. The apparatus of claim 1, in which the communications path comprises a path to the master node through at least two neighboring remote nodes of the ad hoc network, and in which the processor is configured to relay the sensor data to the at least two neighboring remote nodes according to a point-to-multipoint scheme.

4. The apparatus of claim 1, in which the receiver comprises at least one of a photodiode, a phototransistor, a photomultiplier, a charge-coupled device (CCD), and a complimentary metal-oxide-semiconductor (CMOS) circuits.

5. The apparatus of claim 1, in which the processor of each of the plurality of remote nodes is further configured to activate a sleep mode at the end of the data collection cycle in the TDMA scheme.

6. The apparatus of claim 1, in which the master node is wired to a communications network and is wired to a power supply.

7. The apparatus of claim 1, in which the sensor comprises at least one of a temperature sensor, a pH sensor, a dissolved O2 sensor, a backscatter sensor, a camera, an ambient light sensor, an autofluorescence sensor, an accelerometer, a conductivity sensor, and a pressure sensor.

8. The apparatus of claim 1, in which the light source comprises a 473-nanometer blue light emitting diode (LED).

9. The apparatus of claim 1, in which the master node comprises a photo- multiplier tube (PMT) configured to amplify light signals received from the light source of the at least one remote node.

10. The apparatus of claim 1, wherein the processor is further configured to: receive additional sensor data from at least one other child node destined for another of the at least one remote node; store the received additional sensor data; and relay, through the transmitter, the additional sensor data with the sensor data and the other sensor data to the master node according to the time division multiple access (TDMA) scheme.

11. A method, comprising: receiving, by a processor of a remote node of an ad hoc network, data from a sensor; identifying, by a processor, a communications path to a master node through at least one other remote node of the ad hoc network; transmitting, through a transmitter, an indication of a clock value to at least one child node of the at least one other remote nodes in the ad hoc network; receiving, by the processor, other sensor data from the at least one child node of the ad hoc network based on the transmitted clock value; transmitting, through a transmitter of the remote node by the processor, the sensor data and the other sensor data through the communications path according to a time division multiple access (TDMA) scheme without global clock synchronization and only after receiving other sensor data from each of the at least one child nodes assigned to the remote node; and dynamically reconfiguring, by the processor, the communications path when the ad hoc network changes by rebuilding a spanning tree of the ad hoc network after each relay of the sensor data and the other sensor data.

12. The method of claim 11, in which the step of transmitting comprises wirelessly transmitting through an optical interface.

13. The method of claim 11, in which the step of transmitting according to the TDMA scheme comprises identifying a time slot in a time frame corresponding to the remote node.

14. The method of claim 11, in which the step of identifying the communications path comprises: seeding a tree with no as the master node; populating the tree with ni nodes between the remote node and the master node; and tracing the communications path through at least one other node of the ad hoc network to the master node.

15. The method of claim 14, further comprising storing, at the remote node, information regarding the ad hoc network.

16. The method of claim 15, further comprising: receiving, from at least one other remote node of the ad hoc network, the tree comprising information regarding a plurality of remote nodes in the ad hoc network; and propagating the tree from the remote node to at least one other remote node of the ad hoc network.

17. The method of claim 15, further comprising storing, at the remote node, level information regarding a number of hops from the remote node to the master node.

18. The method of claim 11, in which the sensor data comprises at least one of temperature data, pH data, dissolved 02 data, backscatter data, and ambient light data.

19. The method of claim 11, further comprising transmitting, through the transmitter of the remote node, the sensor data and the other sensor data to a second at least one other remote node of the ad hoc network according to a point-to-multipoint scheme.

20. The method of claim 11, further comprising: receiving additional sensor data from at least one other remote node not assigned to the remote node destined for another of the at least one other remote nodes; storing the received additional sensor data; and relaying, through the transmitter, the additional sensor data with the sensor data and the other sensor data to the master node according to the time division multiple access (TDMA) scheme.

* * * * *